US 8,051,028 B2

(12) United States Patent
Karnik et al.

(10) Patent No.: US 8,051,028 B2
(45) Date of Patent: Nov. 1, 2011

(54) METHOD AND APPARATUS FOR GENERATING CONFIGURATION RULES FOR COMPUTING ENTITIES WITHIN A COMPUTING ENVIRONMENT USING ASSOCIATION RULE MINING

(75) Inventors: Neeran Karnik, Pune (IN); Subhojit Roy, Pune (IN); Navin Kabra, Pune (IN)

(73) Assignee: Symantec Corporation, Mountain View, CA (US)

( * ) Notice: Subject to any disclaimer, the term of this patent is extended or adjusted under 35 U.S.C. 154(b) by 965 days.

(21) Appl. No.: 11/809,419

(22) Filed: May 31, 2007

(65) Prior Publication Data

US 2008/0301081 A1 Dec. 4, 2008

(51) Int. Cl.
*G06F 17/00* (2006.01)
(52) U.S. Cl. ......... 706/48; 709/220; 709/221; 717/170
(58) Field of Classification Search .......... 706/12, 706/14, 48, 45, 46, 47; 717/168, 169, 171; 726/1; 709/220, 221
See application file for complete search history.

(56) References Cited

U.S. PATENT DOCUMENTS

| | | | |
|---|---|---|---|
| 6,498,791 B2 | 12/2002 | Pickett et al. | 370/353 |
| 6,512,526 B1 | 1/2003 | McGlothlin et al. | 345/762 |
| 6,539,456 B2 | 3/2003 | Stewart | 711/113 |
| 6,543,047 B1 | 4/2003 | Vrhel, Jr. et al. | 717/121 |
| 6,550,006 B1 | 4/2003 | Khanna | 713/2 |
| 6,560,606 B1 | 5/2003 | Young | 707/100 |
| 6,564,112 B1 | 5/2003 | Factor | 700/97 |
| 6,577,229 B1 | 6/2003 | Bonneau et al. | 340/10.41 |
| 6,578,141 B2 | 6/2003 | Kelley et al. | 713/1 |
| 6,598,131 B2 | 7/2003 | Kedem et al. | 711/147 |
| 6,601,095 B1 | 7/2003 | Duffieldetal. | 709/222 |
| 6,601,166 B1 | 7/2003 | Avyar et al. | 713/2 |
| 6,615,365 B1 | 9/2003 | Jenevein et al. | 714/6 |
| 6,633,916 B2 | 10/2003 | Kauffman | 709/229 |
| 6,662,267 B2 | 12/2003 | Stewart | 711/113 |
| 6,668,327 B1 | 12/2003 | Prabandham et al. | 713/2 |
| 6,684,327 B1 | 1/2004 | Anand et al. | 713/2 |
| 6,711,688 B1 | 3/2004 | Hubacher et al. | 713/201 |
| 6,748,525 B1 | 6/2004 | Hubacher et al. | 713/1 |
| 6,757,837 B1 | 6/2004 | Platt et al. | 714/4 |
| 6,768,901 B1 | 7/2004 | Osborn et al. | 455/230 |
| 6,802,062 B1 | 10/2004 | Oyamada et al. | 718/1 |
| 6,804,774 B1 | 10/2004 | Larvoire et al. | 713/2 |
| 6,810,478 B1 | 10/2004 | Anand et al. | 713/2 |
| 7,043,724 B2 | 5/2006 | Blume et al. | 717/168 |

(Continued)

FOREIGN PATENT DOCUMENTS

CN 200810098346 12/2008

(Continued)

OTHER PUBLICATIONS

Chizi and Maimon. Dimension Reduction and Feature Selection. Data Mining and Knowledge Discovery Handbook. 2005. p. 93-111.*

(Continued)

*Primary Examiner* — Jeffrey A Gaffin
*Assistant Examiner* — David H Kim
(74) *Attorney, Agent, or Firm* — Campbell Stephenson LLP

(57) ABSTRACT

A method and apparatus for generating computer configuration rules comprising receiving configuration data regarding a plurality of computers, analyzing the configuration data to determine associations within the configuration data, and generating configuration rules from a result of the analysis.

17 Claims, 3 Drawing Sheets

U.S. PATENT DOCUMENTS

| | | | |
|---|---|---|---|
| 7,065,566 B2 * | 6/2006 | Menard et al. | 709/223 |
| 7,065,637 B1 | 6/2006 | Nanja | 713/1 |
| 7,082,521 B1 | 7/2006 | Nanja | 713/1 |
| 7,747,709 B2 | 6/2010 | Behrendt et al. | 709/220 |
| 2002/0100036 A1 * | 7/2002 | Moshir et al. | 717/173 |
| 2002/0107843 A1 * | 8/2002 | Biebesheimer et al. | 707/3 |
| 2003/0028825 A1 * | 2/2003 | Hines | 714/37 |
| 2003/0167245 A1 * | 9/2003 | Murata | 706/46 |
| 2004/0221146 A1 | 11/2004 | Baumann | 713/1 |
| 2004/0243692 A1 * | 12/2004 | Arnold et al. | 709/220 |
| 2005/0228789 A1 * | 10/2005 | Fawcett et al. | 707/6 |
| 2006/0101402 A1 * | 5/2006 | Miller et al. | 717/124 |
| 2008/0244028 A1 | 10/2008 | Le et al. | 709/208 |
| 2008/0301081 A1 | 12/2008 | Karnik et al. | 706/48 |
| 2009/0040947 A1 | 2/2009 | Krivopaltsev | 370/255 |

FOREIGN PATENT DOCUMENTS

| | | |
|---|---|---|
| EP | 745929 A1 | 4/1996 |
| EP | 841616 A2 | 5/1998 |
| EP | 1998252 A1 | 12/2008 |
| JP | 2009-048611 | 3/2009 |

OTHER PUBLICATIONS

Indranil Bose, Radha K. Mahapatra, Business data mining—a machine learning perspective, Information & Management, vol. 39, Issue 3, Dec. 20, 2001, pp. 211-225.*

Basmaciyan. Data center consolidation—the logical move. Enterprise Data Center, Sep. 2004. pp. 1-13.*

European Search Report mailed Sep. 12, 2008 for EPC Application No. 08009816.3-2211.

Rho, Sue et al., "Configuring Requirements-Compliant Multi-agent Systems," IEEE 2nd Symposium on Multi-agent Security and Survivability, Aug. 30-31, 2005. IEEE, Aug. 30, 2005, pp. 58-65.

Friesenhahn, B., "Autoconf Makes for Portable Software," BYTE, McGraw-Hill Inc., vol. 22, No. 11, Nov. 1, 1997, pp. 45-46.

Schuba, Christoph L. et al., "Scaling Network Services Using Programmable Network Devices," Computer, IEEE Service Center, vol. 38, No. 4, Apr. 1, 2005, pp. 52-60.

Ambardar, Sidarth et al., "Dynamic Router Configuration Management for Wireless Mobile Environments," Radio and Wireless Conference (RAWCON '98), IEEE, Aug. 9-12, 1998. IEEE, Aug. 9, 1998, pp. 31-34.

Heimbigner, Dennis et al. "A Framework for Analyzing Configurations of Deployable Software Systems," Fifth IEEE International Conference on Engineering of Complex Computer Systems, 1999 (ICECCS '99), Oct. 18-21, 1999. Comput. Soc., Oct. 18, 1999, pp. 32-42.

Tong, Yuchu et al., "A Flexible Multimedia Cooperative Product Design Platform Framework," The 7th International Conference on Computer Supported Cooperative Work in Design, Sep. 25-27, 2002. IEEE, Sep. 25, 2002, pp. 198-204.

Arshad, Naveed et al., "Deployment and Dynamic Reconfiguration Planning for Distributed Software Systems," Proceedings of the 15th IEEE International Conference on Tools with Artificial Intelligence (ICTAI '03), Nov. 3-5, 2003. IEEE Comp. Soc., vol. CONF. 15, Nov. 3, 2003, pp. 39-46.

Halle, Sylvain et al., "Self-configuration of Network Devices with Configuration Logic," Autonomic Networking Lecture Notes in Computer Science; LNCS, Springer, Berlin, DE, vol. 4195, Jan. 1, 2006, pp. 36-49.

Gencay, Eray et al., "SANchk: An SQL-Based Validation System for SAN Configuration," 10th IFIP/IEEE International Symposium on Integrated Network Management, 2007 (IM '07). IEEE, PI, May 1, 2007, pp. 333-342.

Androutsopoulos, I. et al., "An Evaluation of Naive Bayesian Anti-Spam Filtering," Machine Learning in the New Information Age; 2000, pp. 9-17.

Basmaciyan, Rober, "Data Center Consolidation—the Logical move," Enterprise Data Center, Sep. 2004, pp. 1-13.

Bose, Indranil; Radha K. Mahapatra; "Business Data Mining—A Machine Learning Perspective—Information & Management," vol. 39, Issue 3, Dec. 20, 2001, pp. 211-225.

Chebrolu, S. et al., "Feature Deduction and Ensemble Design of Intrusion Detection Systems," Computers and Security 24, pp. 295-307, 2005.

Chizi and Maimon, "Dimension Reduction and Feature Selection," Data Mining and Knowledge Discovery Handbook, 005, pp. 93-111.

Cronk, R. et al., "Rule-Based Expert System for Network Management and Operations: An Introduction," IEEE Network, 1988, 11 pages.

Debenham, Clive, "Taos: The operating system," Mar. 1995, Newsgroups: comp. parallel, pp. 1-8.

European Search Report mailed Sep. 12, 2008; EPC Application No. 08009816.3-2211; 10 pages.

Foundation Template Software's Application Developer's Training Course, SNAP 8.0, Module 7, 1997, 37 pages.

Goodman, R. et al., "Rule-Based Neural Networks for Classification and Probability Estimation," Neural Computation 4, pp. 781-804, 1992.

Heimbigner, Dennis et al., "A Framework for Analyzing Configurations of Deployable Software Systems," Fifth IEEE International Conference on Engineering of Complex Computer Systems, 1999 (ICECCS '99), Oct. 18-21, 1999, Comput. Soc., pp. 32-42.

Henry, Mike, Intel Corporation, *Extending PXE to Mobile Platforms*, Jun. 1998, pp. 1-4, http://www.intel.com/update/archive/psn/psn06985.pdf.

Huang, Peter, California Polytechnic State University *Design and Implementation of the CiNIC Software Architecture on a Windows Host*, Feb. 2001, pp. i-87, http://www.ee.calpoly.edu/3comproject/masters-thesis/Huang-Peter.pdf., 97 pp.

Pelikan, M. et al., "Hierarchical Bayesian Optimization Algorithm," Springerlink, 2006, pp. 63-90.

Rho, Sue et al., "Configuring Requirements—Compliant Multi-Agent Systems," IEEE 2nd Symposium on Multi-Agent Security and Survivability, Aug. 30-31, 2005, IEEE, pp. 58-65.

Simon (simon@yamaha.demon.cok.uk), Note, *Computer Systems Built to Order*, (2 pages).

Web Component, Using the Web Component, Copyright 1997, Template Software, Inc., 65 pp.

Workflow Template, Developing a WFT Workflow System, Whole manual, 1998, 353 pp.

Workflow Template, Using the WFT Development Environment, Whole manual, 1998, 413 pp.

Workflow Template, Using the Web Component, Whole manual, 1998, 66 pp.

* cited by examiner

METHOD AND APPARATUS FOR GENERATING CONFIGURATION RULES FOR COMPUTING ENTITIES WITHIN A COMPUTING ENVIRONMENT USING ASSOCIATION RULE MINING

BACKGROUND OF THE INVENTION

1. Field of the Invention

The present invention generally relates to computer network management. More particularly, the present invention pertains to a method and apparatus for generating configuration rules for computing entities within a computing environment using association rule mining.

2. Description of the Related Art

Typically, a data center is a facility within a computing environment that is used to house mission critical computer systems and associated components. A data center includes environmental controls, such as air conditioning, fire suppression, and the like, redundant/backup power supplies, redundant data communications connections and high security among others. A bank, for example, may have a data center, where all its customers' account information is maintained and transactions involving these data are performed. Likewise, in another example, practically every company either mid-sized or larger has some kind of data center with larger companies often having dozens of data centers. Besides, most large cities have many purpose-built data center buildings in secure locations near telecommunications services. Most collocation centers and Internet peering points are located in these kinds of facilities.

Conventional enterprise data centers frequently accommodate thousands of servers, running hundreds of applications. For instance, in such circumstances, it is difficult to administer these servers so that all the servers are appropriately configured, patched, and the like, in accordance with the applications they host.

In order to handle the aforementioned circumstances, the current practice is to utilize discovery tools to gather configuration data from the data center. Test the configuration data gathered against a set of predefined rules, such as templates, reference configurations, gold standards, and the like, usually derived from 'best practices' or IT policies. Eventually, flag the violations or anomalies for administrator attention.

Although, anomalies or violations amid the servers, other data elements (i.e. storage, network, and the like), and the applications they host are detected by utilizing the aforementioned practice, this practice merely facilitates testing of the gathered configuration data against the predefined rules (or hard coded set of rules.) This is owing to the fact that not all applications, in conventional data centers, have their corresponding reference template specified. In certain scenarios, even if the templates for some applications are specified, not all configuration parameters (or rules) may be codified as some of the rules will be inevitably overlooked owing to human error. Besides, the templates may be incomplete and incompletely instantiated. Also, as data centers evolve over time, these rules have to be updated accordingly. Inevitably, templates will lag behind the state of the data center, because configuration sanity-checking takes lower priority than keeping the applications available, updated and secure.

Data centers are usually managed in 'silos.' Within a given data center, storage administrators independently manage storage devices and specify their templates. More specifically, server templates are independently specified by server administrators, and so on. In such scenarios, configuration settings that span across these silos cannot therefore be easily captured in templates. Thus, configuration errors that occur due to lack of coordination among these administrators often remain undetected until they actually result in a potential problem.

As stated above, existing tools require a hard-coded set of rules against which the configuration data is checked. However, such tools fail to discover unanticipated types of configuration errors. Moreover, domain expertise is needed to create these set of rules.

Accordingly, there is a need in the art for methods and apparatuses to facilitate automated configuration rule definition.

SUMMARY OF THE INVENTION

The present invention comprises various embodiments of a method and apparatus for generating computer configuration rules comprising receiving configuration data regarding a plurality of computing entities, analyzing the configuration data to determine associations within the configuration data, and generating configuration rules from a result of the analysis.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention is generally directed towards a method and apparatus for automatically generating computer configuration rules for a plurality of computing entities operating within a computing environment. Further embodiments of the invention use the rules to perform rule compliance analysis for the computing environment.

Figure 1:
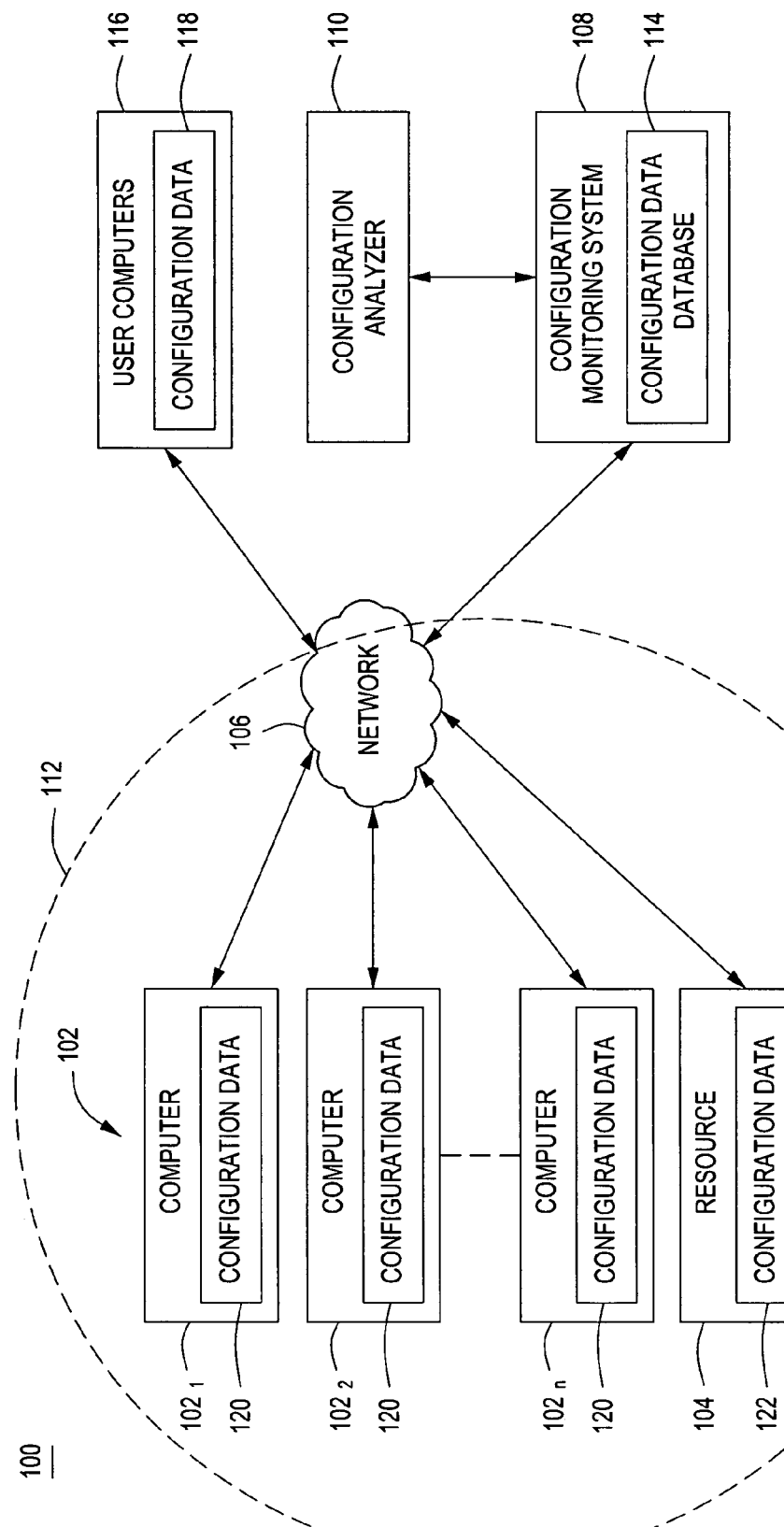
FIG. 1 is a block diagram of a system employing an apparatus for automatically generating computer configuration rules, in accordance with at least one embodiment of the present invention.

FIG. 1 is a block diagram of a system 100 employing an apparatus for automatically generating computer configuration rules in accordance with at least one embodiment of the present invention.

The apparatus is usable for practicing a method for automatically generating computer configuration rules in accordance with the principles of the present invention. Details in connection with the apparatus have been disclosed with reference to FIG. 2, whereas the method is discussed with reference to FIG. 3.

The computer system 100 (also referred to herein as a computing environment) comprises a plurality of computers $102_1$, $102_2$, . . . $102_n$ (collectively computers 102) multiple resources 104, a network 106, at least one user computer 116, a configuration monitoring system 108 (e.g., Veritas Command Central Storage or Veritas Configuration Manager available from Symantec Corporation) and a configuration analyzer 110. The specific arrangement or number of computers 102 and/or user computers 116 is unimportant to the operation of the invention. The environment may contain only data center computers 102, only user computers 116, or any combination thereof.

The term "entities" or "computing entities", as used in this document, refers to one or more systems, resources, devices including, for example, one or more applications, servers, mobile computing devices such as cell phones and personal digital assistants (PDAs), storage systems, peripherals, networks, computers and the like.

Portion of the system 100 including the computers 102, the resources 104 and a section of the network 106 generally constitutes a data center 112, for example, as illustrated in FIG. 1. The user computers 116 generally utilize services provided by the data center 112.

The term "data center", as used herein, refers to a resource utilized for accommodating a large number of electronic equipment, typically computers and communications equipment. As the name implies, a data center is usually maintained by an organization for the purpose of handling the data necessary for its operations. For added security, redundancy and failure avoidance, a data center may include environmental controls, such as air conditioning, fire suppression and the like, redundant/backup power supplies, redundant data communications connections and high security among other features.

Communications in data centers are most often based on networks running the Internet Protocol (IP) suite. Data centers contain at least one router and/or switch that transport traffic between the servers as well as to the Internet (and/or a private network). Redundancy of the Internet connection is often provided by using two or more upstream service providers. Some of the servers at the data center are used for running the basic Internet and intranet services needed by internal users in the organization: email servers, proxy servers, DNS servers, and the like. Network security elements are also usually deployed: firewalls, VPN gateways, intrusion detection systems, and the like. Also common are monitoring systems for the network and some of the applications. Additional off site monitoring systems are also typical, in case of a failure of communications inside the data center.

In one embodiment of the invention, network 106 runs the Internet Protocol (IP) suite. The network 106 comprises at least one router and/or switch (not shown) that transports data traffic in a well known manner amongst the computers 102 within the data center 112 as well as between the data center 112 and the user computers 116.

Each of the computers 102, user computers 116 and resources 104 contain configuration data. Optionally, the configuration data is unique to each of the computers 102, user computers 116 and the resources 104. In other embodiments, the configuration data may not be unique to each of the plurality of computers 102, the user computers 116 and the plurality of resources 104. To facilitate access and monitoring of the configuration data of each computing entity within the computing environment, each of the plurality of computers 102, the user computers 116, and the plurality of resources 104 are coupled through the network 106 to the configuration monitoring system 108.

The term "resource", as used herein, refers to any physical or virtual component of limited availability within a computer system. Every computing entity connected to a computer system is, in essence, a resource. Every internal system component is a resource. Virtual system resources include files, virtual block devices, network connections applications, processes, memory areas and the like. In its broadest sense; a resource is an component (whether real or virtual) that facilitates the operation of the computing environment for its intended purpose.

The term "configuration", as used herein, refers to an arrangement of functional units according to their nature, number, and chief characteristics. Often, configuration pertains to the choice of hardware, software, firmware, and documentation, as well as the specific selection of operational parameters, memory size, cache allocation, display resolution, network access bandwidth, redundancy requirements and the like. The configuration affects system function and performance. In computers and computer networks, a configuration often refers to the specific hardware and software details in terms of devices attached, device driver version, tunable parameter settings, capacity or capability, and exactly what computing entities comprise the system.

As used in this document, the term "configuration data" refers to fine-grained data that is collected by enterprise data center products, such as monitoring tools, about systems, resources, devices, and the like, for example, applications, servers, storage, user computers, and networks, and the like. This data may be collected by polling or using agents on the various computing entities of the computing environment. The data is saved in databases and is updated periodically. Such data collection is performed by systems known in the art such as Command Central Storage, Veritas Configuration Manager Control Compliance Suite, and the like, which are available from SYMANTEC Corporation. The configuration data from such systems may be available in a configuration management database (CMDB), which is periodically refreshed.

As used herein the term "configuration management database (CMDB)" refers to a database that contains all relevant information about the components of the computing environment of an organization's IT services and the relationships between those components. A CMDB provides an organized view of data and a means of examining that data from any desired perspective. Within this context, components of an information system are referred to as "configuration items (CI)." A CI can be any conceivable IT component, including software, hardware, documentation, and personnel, as well as any combination thereof. The processes of configuration management seek to specify, control, and track configuration items and any changes made to them in a comprehensive and systematic fashion. The IT Infrastructure Library (ITIL) best practices standards include specifications for configuration management. According to ITIL specifications, the four major tasks of configuration management are: identification of configuration items to be included in the CMDB; control of data to ensure that it can only be changed by authorized individuals; status maintenance, which involves ensuring that current status of any CI is consistently recorded and kept updated; and verification through audits and reviews of the data to ensure that it is accurate.

Configuration monitoring system 108 includes a configuration data database 114, one example of such a database is the CMDB discussed above. The configuration monitoring system 108 is responsible for collecting or accumulating fine-grained configuration data 120 and 122 about various entities, such as systems, resources, devices, and the like, constituting the data center 112 and, in an alternative embodiment, including user computer configuration data 118. The entities, for example, are the plurality of computers 102 and the plurality of resources 104. In the illustration of FIG. 1, the configuration monitoring system 108 is capable of collecting fine-grained configuration data regarding each of the plurality of computers 102 and resources 104 as well as from user computer 116. For example, certain scenarios involve the utilization of SYMANTEC products, such as COMMAND CENTRAL STORAGE, Veritas Configuration Manager Control Compliance Suite, and the like, to collect such configuration data.

Operationally, the configuration monitoring system 108 extracts configuration information on a per-entity basis by querying one or more data sources, such as computing entities in the computing environment. By way of example, and not as a limitation, the configuration monitoring system 108 extracts configuration information on a per-computer and/or per-resource basis by querying each of the plurality of computers 102 and resources 104. More specifically, for each of the plurality of computers 102 and resources 104 at least a plurality of attributes, such as its operating system (OS) version and patch level, the applications running on the computer or resource, the network interfaces, the storage interfaces or host bus adapters (HBAs), the firmware and driver versions, and the like, are accumulated. Noticeable here is the fact that all the configuration information for any or a given computer 102 or resource 104 can be conceptually represented as a row in a table, for example, a database record, among others. Similar data monitoring may be performed regarding user computers 116.

In certain embodiments of the present invention, the configuration monitoring system 108 aggregates the configuration data from multiple underlying subsystems, i.e., referred to as "silos". For example, some configuration data (or attributes) such as hosted applications, OS versions and the like are gathered by Veritas Configuration Manager, whereas others such as number of HBAs, driver versions and so on are collected by COMMAND CENTRAL STORAGE and so forth. This configuration data is stored in the configuration data database 114. Thus, in practice, storing all the configuration information in a relational database requires normalization of the configuration data contained therein. This leads to the creation of multiple tables linked by appropriate foreign keys. Data gathered at the host level may be in a different database versus data gathered from storage or network elements depending upon the monitoring system that is used for collecting this data. This is also dependent on which set of administrators choose to use which kind of monitoring/reporting mechanisms for their "silos".

Reiterating again, all the configuration information for any or a given computer 102, user computer 116 or resource 104 is conceptually represented as a row in a table for example, a database record. In certain embodiments, this table contains at least a plurality of such rows. Each of the plurality of rows contains at least a plurality of configuration attributes corresponding to at least a plurality of entities. For purposes of illustration, Table 1 depicts a table that stores the configuration information of a computer 102 functioning as a server.

TABLE 1

| HOSTNAME | HOSTED APPLICATION | OS & VERSION | NUMEBER OF NIC(S) | NUMBER OF HBA(S) | OTHERS |
|---|---|---|---|---|---|
| FOO.SYMANTEC.COM | ORACLE | RHEL.V3 | 1 | 2 | ... |
| BAR.SYMANTEC.COM | EXCHANGE | WIN2003 | 2 | 2 | ... |
| OTHERS | ... | ... | ... | ... | ... |

Configuration analyzer 110 administers the plurality of computers 102 and/or resources 104 in order to ensure that they are appropriately configured. In order to do so, the configuration analyzer 110 accesses the configuration data database 114, i.e., the input to the configuration analyzer 110 is the configuration data database 114. The configuration analyzer 110 applies association rule mining to discover relationships between the configuration attributes without requiring semantics of the data. The configuration analyzer 110 preprocesses the data. From an analysis of the configuration data, the configuration analyzer 110 automatically generates inferred association rules. Optionally, the configuration analyzer 110 includes a mechanism for an administrator to explicitly specify some rules (like the template-based systems discussed earlier). The configuration analyzer 110 combines the inferred and validated rules with specified rules in a common rule-base. The configuration analyzer 110 detects misconfigured elements of the computing environment. The configuration analyzer 110 compares the configuration data against each of the association rules. The configuration analyzer 110 detects anomalies in the configuration data (or violations of the rule). The configuration analyzer 110 may display the violated rules and raise an alarm as well as display the violating configuration data. The configuration analyzer 110 runs out-of-band (or offline) with respect to the data center 112 operations. Thus, operation of the analyzer 110 does not impact the functioning of other elements within the computing environment.

The analysis techniques, employed by the configuration analyzer 110 of the present invention are independent of semantics of the configuration (or data) being analyzed. Thus, these analysis techniques can be advantageously applied to a range of application, server, storage and/or network related configuration parameters, settings, and the like. In addition, assortment of data types, such as numeric, symbolic, Boolean and so on, are handled by these analysis techniques. Although, it has been mentioned that these analysis techniques can be applied to range of application, server, storage and/or network related configuration parameters, those skilled in the art will appreciate that their application may be applied to any data center element or entity. For example, instead of the table of the plurality of computers 102 and/or resources 104 separate tables for storage devices or networking devices or applications can be also be created.

For purposes of illustration, Tables 2 and 3 depict, for example, other tables that may be processed by the configuration analyzer 110.

TABLE 2

| DISK ID | DISK TYPE | FIRMWARE VERSION | DRIVER VERSION | ZONE ID | OTHERS |
|---------|-----------|------------------|----------------|---------|--------|
| 001 | SCSI | 4.1 | 7.5 | X | ... |
| 002 | SATA | 1.3 | 4.4 | Y | ... |

TABLE 3

| App Name | Instance ID | Version no. | Owner | #Users | OTHERS |
|----------|-------------|-------------|-------|--------|--------|
| EXCHANGE | 1 | 5.2 | "ADMIN" | 125 | ... |
| EXCHANGE | 2 | 5.2 | "NULL" | 250 | ... |

Further details in connection with the configuration analyzer 110 are provided with reference to FIG. 2 below.

Figure 2:
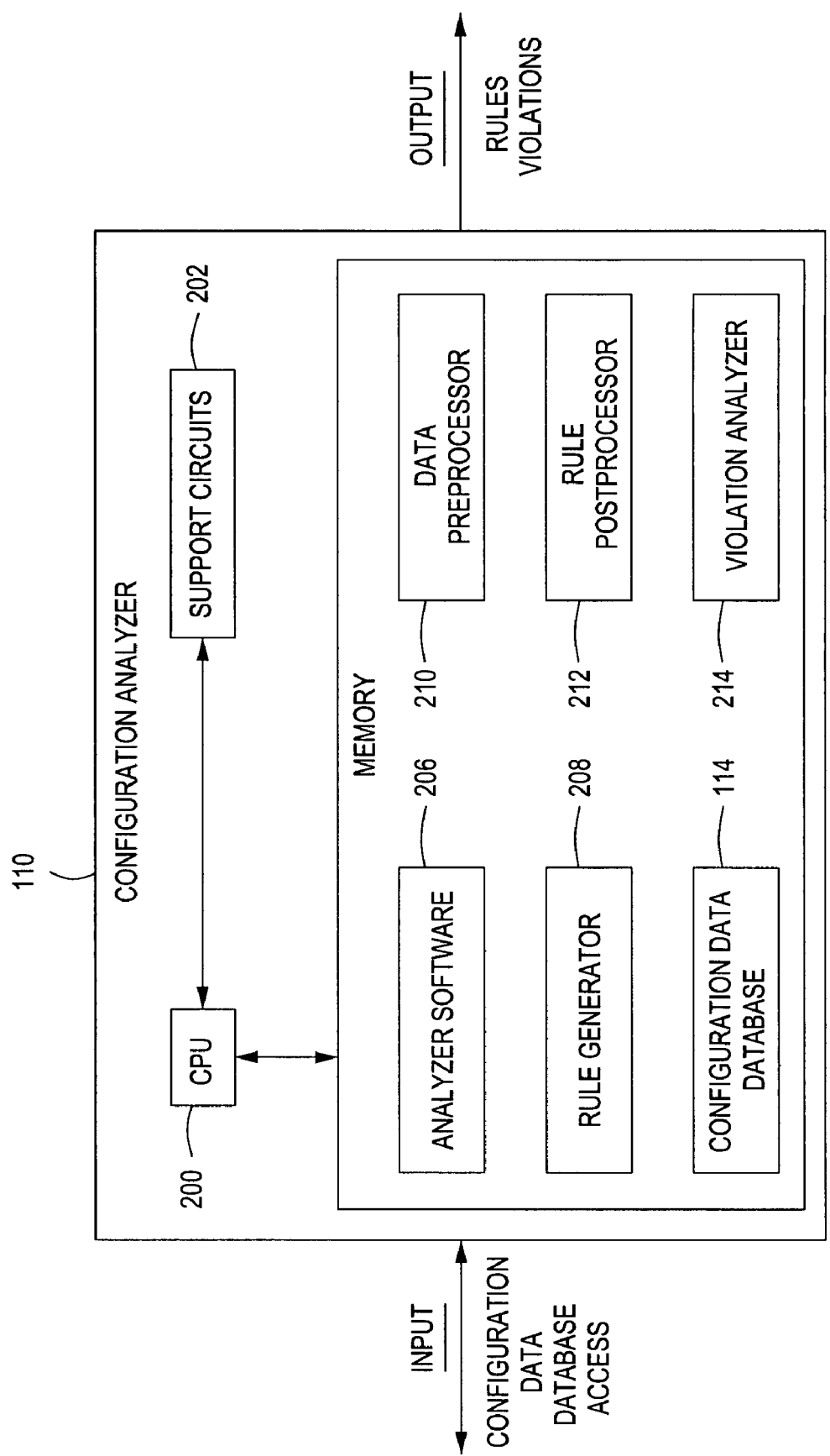
FIG. 2 depicts a detailed view of the configuration analyzer of FIG. 1.

FIG. 2 depicts a detailed block diagram of the configuration analyzer 110 of FIG. 1. The configuration analyzer 110 is a computing device comprising a (meaning "at least one" unless otherwise specified) central processing unit (CPU) 200, support circuits 202 and a memory 204. The CPU 200 may comprise one or more commercially available microprocessors or microcontrollers that facilitate data processing and storage. The support circuits 202 facilitate operation of the CPU 201 and comprise at least one of clock circuits, power supplies, cache, input/output circuits, and the like. The memory 204 comprises at least one of read only memory (ROM), random access memory (RAM), disk drive storage, optical storage, removable storage, and the like. The memory 204 further comprises an analyzer software 206, a rule generator 208, the configuration data database 114, a data preprocessor 210, a rule postprocessor 212 and a violation analyzer 214.

Operationally, the configuration analyzer 110 accesses the configuration data database 114. This is owing to the fact that the configuration data database 114 serves as a shared resource for both the configuration monitoring system 108 and the configuration analyzer 110. Thus, the input to the configuration analyzer 110 is the contents of the configuration data database 114.

In one embodiment of the invention, the data preprocessor 210 is used to optimize the data utilization and rule generation. For example, buckets are used to classify the similar devices and filter data (i.e., selecting specific columns in the tables) is used to select certain data for processors. This helps expedite processing by the analyzer software 206 and optimize its ability of finding correlations between one or more configuration attributes constituting the configuration information. However, such classification is not necessary for operation of this invention. Classification only helps in reducing the number of rules/violations that are generated by the configuration analyzer while operating upon a given configuration data database.

Analyzer software 206 accesses the table, representing the configuration data of at least one of computers 102, user computers 116 and resources 104. The analyzer software 206 implements the association rule mining algorithm, such as market basket analysis, which is, in essence, a data mining technique. This will be detailed with respect to FIG. 3 below.

The term "association rule mining", as used in this document and performed by the analyzer software 206, refers to patterns discovered in data via the process of data mining, which searches the database for patterns.

Thus, in some scenarios, the analyzer software 206 analyzes the configuration data collected from the plurality of computers 102, user computer 116 and resources 104. In certain embodiments, the analyzer software 206 analyzes the table, representing the configuration data and infers relationships between columns of the table based on their values. For example, in some scenarios the table data may show that all (or most) computers 102 running ORACLE have at least two HBAs, because the database is typically given multiple paths to storage for redundancy and performance reasons. By analyzing this data, the analyzer software infers the following association rule: {HOSTED APPLICATION=ORACLE}→{NUMBER OF HBA(S) $\geq 2$}. Later, the rule generator 208 generates the aforementioned association rule based on the configuration data.

Optionally, the analyzer software 206 analyzes the preprocessed configuration data. This helps expedite the analyzer software 206 and optimize its ability of finding correlations between one or more configuration attributes constituting the configuration information.

In some other scenarios, the analyzer software 206 selects firmware versions on the HBAs for inferring a relationship. The analyzer software 206 analyzes the configuration data table and infers relationships between columns (or configuration attributes or attribute-value pairs) of the table, such as firmware versions and HBAs, based on their values for a given storage area network entity. For example, if the analyzer software 206 observes that most computers 102 in a particular storage area network (SAN) zone have HBA firmware version 3.0 or higher, then the rule extracted is the following: {ZONE=X}→{HBA FIRMWARE VERSION$\geq 3.0$}. Later, the rule generator 208 generates the aforementioned association rule.

In at least certain embodiments of the invention, some standard statistical parameters are calculated by the analyzer software 206 to determine the reliability of the association rules. More specifically, the analyzer software 206 determines the reliability of the inferred rules prior to generation of the inferred rules by the rule generator 208. It must be noted here that the analyzer software 206 infers the association rules on analysis of the configuration data and the rule generator 208 generates the inferred association rules. The analyzer software 206 calculates standard statistical parameters, such as support, confidence and lift, to determine the reliability of the association rules. The term "reliability", as used here, implies how strongly an inferred association rule should be believed upon.

Note must be taken here that the principal parts of an association rule are the rule body (also referred to as antecedent) and the rule head (also referred to as consequent). For example, where [X] [Y]=>[Z] is an association rule: The item set [X] [Y] is the rule body whereas the item [Z] is the rule head. The rule body contains the item or items for which the associations mining function have found an associated item. The rule head contains the item found. The limit to the number of items found in an association rule, for example, maximum rule length, can be explicitly defined and set.

Thus the term "support" or "support of an association rule", as used in this document, refers to the percentage of groups that contain all of the items listed in that association rule. The percentage value is calculated from among all the groups that were considered. This percentage value shows how often the joined rule body and rule head occur among all of the groups that were considered. Thus, the support of a rule is the percentage equivalent of "A/B", where the values are: A, which is the number of groups containing all the items that appear in the rule and B that is the total number of all the groups that are considered. The rules that achieve a certain minimum level of support are included in a given mining model can be explicitly specified. This ensures a highly meaningful result. It is also one of the ways in which the number of rules that are created can be controlled.

Similarly, the term "confidence" or "confidence of an association rule," as used herein, refers to a percentage value that shows how frequently the rule head occurs among all the groups containing the rule body. The confidence value indicates how reliable this rule is. The higher the value, the more often this set of items is associated together. Thus, the confidence of a rule is the percentage equivalent of M/N, where the values are: M that is the number of groups containing the joined rule head and rule body and N, which is the number of groups containing the rule body. It must be noted here that just as in the case of the support factor, the rules that achieve a certain minimum level of confidence are included in a given mining model can be explicitly specified. This ensures a definitive result, and it is, again, one of the ways in which the number of rules that are created can be controlled.

Still similarly, the term "lift" or "lift in an association rule," as used in the current context, refers to the importance of a rule. It is a measure for a rule. However, unlike minimum support or minimum confidence, the minimum lift cannot be explicitly defined or specified. The lift value of an association rule is the ratio of the confidence of the rule and the expected confidence of the rule. The expected confidence of a rule is defined as the product of the support values of the rule body and the rule head divided by the support of the rule body. The confidence value is defined as the ratio of the support of the joined rule body and rule head divided by the support of the rule body. For example, the lift value of a rule can be defined in the following manner: LIFT=CONFIDENCE/SUPPORT (HEAD), where support (head) is the support of the rule head.

In certain situations, based on an assumption that the aforementioned statistical parameters calculated by the analyzer software 206 exceed preset thresholds for the rules inferred they are proposed to an administrator for validation. Note must be taken of the fact that no semantics is associated with any of the configuration data analyzed by the analyzer software 206.

An administrator may mark the association rules as valid or invalid. More specifically, the administrator examines a discovered rule (like the two examples above) and indicates whether it is a valid rule, or a coincidence due to some unintended correlations in the data. When the configuration analyzer 110 is first deployed, the discovery or inference of several such coincidental rules along with legitimate rules is expected by the analyzer software 206. However, the configuration analyzer 110 persistently stores the administrator's valid/invalid annotation or markings in a rule-base, which is part of the violation analyzer 214 (discussed below with respect to FIG. 2). In subsequent runs, the same rule is not proposed again. Owing to this, "false positive" rules decline monotonically as long as the underlying schema remains unchanged.

As mentioned earlier, the administrator marks the association rules as valid or invalid. The configuration analyzer 110 is capable of keeping track of such markings and, as long as the logic behind the configuration analyzer 110 remains the same, filters such rules out in future runs. At times, many rules are generated. Some of the rules are slave variation of each other (for example, out of 13 rules, only 3 rules are real.) Therefore, the rules are filtered according to the interest based on various filtering algorithms.

Optionally, the configuration analyzer 110 includes a mechanism for administrators to explicitly specify some rules (like the template-based systems discussed earlier). The discovered and validated rules and explicitly specified (or administrator or user-defined) rules are combined into a common rule-base.

Configuration analyzer 110 detects anomalies in the configuration data. More specifically, the configuration analyzer 110 uses the violation analyzer 214 to detect violations in the association rules. The violation analyzer 214 compares the configuration data against each of the association rules. Noticeable here is the fact that the association rules are stored in the common rule base. The common rule base contains the association rules both automatically inferred (or implicitly generated) and explicitly specified (or user-defined.) For example, the violation analyzer 214 detects violations in the rules to identify misconfigured entities.

In some situations, based on the frequency of collection of the underlying configuration data by the configuration monitoring system 108 and the rate at which the data changes, the configuration analyzer 110 operates periodically (either at fixed or at variable time intervals.) In yet other situations, the configuration analyzer 110 operates due to external triggering. For example, a change management tool like Veritas Configuration Manager Control Compliance Suite may detect a configuration change event, and trigger the execution of the configuration analyzer 110 to analyze whether this change results in a misconfiguration. Thus, an erroneous change can be quickly detected and brought to the administrator's attention. This will be detailed below in connection with the violation analyzer 214.

In certain situations, the violation analyzer 214 finds violations in the rules owing to anomalies in the configuration data. In such situations, the violation analyzer 214 raises an alert to the administrator, in which the violated rule is displayed and the misconfigured entities are listed along with their configuration information. The table rows corresponding to rule violators are displayed. The administrator can then decide whether these anomalies are deliberate or mistake. Corrective actions to address these misconfigurations may then be performed.

Figure 3:
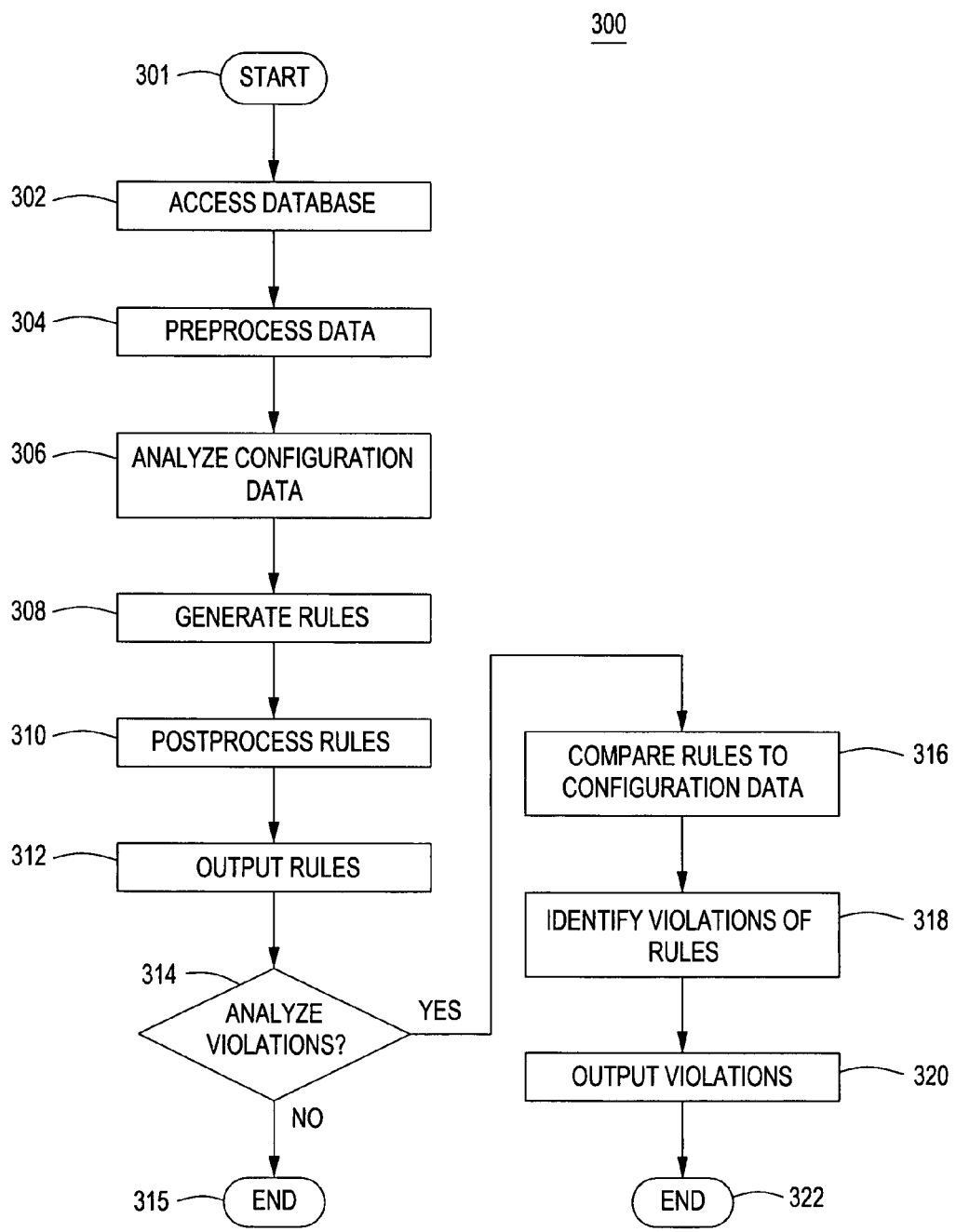
FIG. 3 depicts a flow diagram of a method for automatically generating computer configuration rules using the apparatus of FIG. 2.

FIG. 3 depicts a flow diagram of a method for automatically generating computer configuration rules using the configuration analyzer 110 of FIG. 2.

The method 300 starts at step 301 and proceeds to step 302, where the method 300 accesses the configuration data database. Noticeable here is the fact that the method 300 receives configuration information regarding a plurality of computers and/or resources. This data may be accessed with a shared database of a configuration monitoring system or generated by the analyzer 110 collecting data and building a database.

At step 304, the method 300 optionally preprocesses the configuration information accessed from the configuration data database. Preprocessing is performed to optimize data utilization. For example, buckets are used to classify the similar devices and filtering (or choice of columns) is used to select certain data for processing. This optimizes the ability of finding correlations in the data.

At step 306, the method 300 analyzes the configuration data to detect relationship between the configuration attributes comprising the configuration data. The table representing the configuration data of the plurality of computers and/or resources is coupled to an association rule mining algorithm. By way of example, and in no way limiting the scope of the present invention, market basket analysis is used to perform association rule mining.

Operationally, the association rule mining algorithm, in essence a data mining technique, analyzes the table and infers relationships between its columns based on their values. For example, in some scenarios the table data may show that all (or most) computers and/or resources running ORACLE have at least two HBAs, because the database is typically given multiple paths to storage for redundancy and performance reasons. By analyzing this data, the following association rule is inferred: {HOSTED APP=ORACLE}→{#HBAS≧2}.

Likewise, in some other scenarios, the association rule mining algorithm considers firmware versions on the HBA entities. Noticeable here is the fact that the firmware version represents one of the pluralities of configuration attributes collected by the COMMAND CENTRAL STORAGE for the HBA entity. For example, if most computers and/or resources in a particular storage area network (SAN) zone have HBA firmware version 3.0 or higher, then the rule extracted is the following: {ZONE=X}→{HBA FIRMWARE VERSION≧3.0}.

The analysis techniques, employed by the method of the present invention, are independent of any semantics of the configuration information (or data) under analysis. Thus, these analysis techniques can be advantageously applied to a range of application, server, storage and/or network related configuration parameters, settings, among others. In addition, assortment of data types, such as numeric, symbolic, Boolean and so on, are handled by these analysis techniques. Although, it has been mentioned that these analysis techniques can be applied to range of application, server, storage and/or network related configuration parameters, but their application to any data center element or entity cannot be denied. For example, instead of the table of the plurality of computers and/or resources separate tables for storage devices or networking devices or applications can be also be created.

At step 308, the method 300 generates the rules. More specifically, the method 300 automatically generates the rules based on the relationships found between the configuration attributes comprising the configuration information. It must be noted here that the method 300 starts functioning with an empty rule-base, that is, without any hard coded knowledge about proper and improper configurations. However, the method 300 learns rules from the collected configuration information and thus improves its knowledge base over time.

At step 310, the method 300 involves the task of rule post processing. Once a rule is deducted, then data such as, columns in the configuration data database, for example, are associated. This makes the rules readable and user friendly.

At step 312, the method 300 outputs and/or validates the rule or rules. The administrator may categorize rules as permanent rules or as coincidental rules. The administrator may choose to ignore coincidental rules.

At step 314, in order to handle all the aforementioned circumstances, the method 300 analyzes the rules for violations or detection of anomalies. The method is capable of detecting or identifying misconfigured computing environment elements. More specifically, the method analyzes the configuration information to find violations for each of the rules. In some embodiments of the method, based on an assumption that there exists a violation (or an anomaly is detected), the method raises an alert for the administrator. At step 315, the method 300 ends if violations are not to be analyzed.

At step 316, the method 300 compares the configuration data against each of the association rules.

At step 318, the method 300 identifies or detects violations of the association rules or detects anomalies in the configuration data. Generated and/or predefined rules may be used for the detection of violations.

At step 320, the method 300 outputs the violations. This has been explained in detail earlier with reference to FIG. 2, thus has not been detailed herein.

The method 300 ends at step 322.

The invention is intended to cover all equivalent embodiments, and is limited only by the appended claims. Various other embodiments are possible within the spirit and scope of the invention. While the invention may be susceptible to various modifications and alternative forms, the specific embodiments have been shown by way of example in the drawings and have been described in detail herein. The aforementioned specific embodiments are meant to be for explanatory purposes only, and not intended to delimit the scope of the invention. Rather, the invention is to cover all modifications, equivalents, and alternatives falling within the spirit and scope of the invention as defined by the following appended claims.

What is claimed is:

1. A method comprising:
   receiving configuration data for a plurality of computing entities of a data center,
      wherein the configuration data comprises
         a plurality of attributes, and
         semantics that characterize the configuration data;
   analyzing the configuration data to infer one or more relationships, wherein
      the analyzing infers the one or more relationships between the plurality of attributes,
      the analyzing is performed independent of the semantics of the configuration data, and
      the analyzing is performed by a computing system that comprises at least one processor;
   generating one or more configuration rules based on one or more relationships;
   receiving user input specifying at least one invalid configuration rule out of the one or more configuration rules; and
   filtering out the at least one invalid configuration rule from the one or more configuration rules.

2. The method of claim 1 wherein
   the receiving step further comprises:
      gathering the configuration data through at least one of polling of the computing entities, or applying agents to the computing entities.

3. The method of claim 1 wherein
   the receiving step further comprises:
      saving the configuration data in a database.

4. The method of claim 1 wherein
   the analyzing step comprises:
      preprocessing the configuration data prior to the analyzing.

5. The method of claim 4 wherein
   a configuration table comprises the configuration data, and
   the preprocessing step removes columns from the configuration table.

6. The method of claim 1 further comprising:
   applying statistical analysis to the one or more configuration rules.

7. The method of claim 6 wherein
   the statistical analysis determines a reliability of each of the one or more configuration rules.

8. The method of claim 1 further comprising:
performing post processing with respect to the one or more configuration rules.

9. The method of claim 1 further comprising:
comparing the one or more configuration rules to the configuration data; and
identifying violations of the one or more configuration rules within the configuration data.

10. An apparatus comprising:
an analyzer, comprising at least one processor, for
  analyzing configuration data collected from a plurality of computing entities of a data center, wherein
    the configuration data comprises
      a plurality of attributes, and
      semantics that characterize the configuration data,
    the analyzer infers the one or more relationships between the plurality of attributes,
    the analyzer performs the analyzing independently of the semantics of the configuration data,
  generating at least one configuration rule based on the one or more relationships,
  receiving user input specifying at least one invalid configuration rule out of the at least one configuration rule; and
  filtering out the at least one invalid configuration rule from the at least one configuration rule.

11. The apparatus of claim 10 further comprising:
a configuration data collection system for compiling the configuration data for the plurality of computing entities.

12. The apparatus of claim 10 further comprising:
a preprocessor for preprocessing the configuration data.

13. The apparatus of claim 10 wherein
the analyzer infers the one or more relationships by performing a market basket analysis with respect to the configuration data.

14. The apparatus of claim 10 further comprising:
a post processor that applies statistical analysis to the at least one configuration rule.

15. The apparatus of claim 14 wherein
the statistical analysis determines a reliability of the at least one configuration rule.

16. The apparatus of claim 10 further comprising:
a violation analyzer for
  comparing at least one of the at least one configuration rule and predefined rules to the configuration data, and
  identifying violations of the at least one of the at least one configuration rule or the predefined rules within the configuration data.

17. The method of claim 1, further comprising:
receiving user input specifying one or more explicit configuration rules, and
combining the one or more configuration rules and the one or more explicit configuration rules to generate combined configuration rules.

* * * * *